United States Patent [19]

Brock

[11] Patent Number: 5,168,722

[45] Date of Patent: Dec. 8, 1992

[54] OFF-ROAD EVAPORATIVE AIR COOLER

[75] Inventor: James A. Brock, Alexander, Ark.

[73] Assignee: Walton Enterprises II, L.P., Bentonville, Ark.

[21] Appl. No.: 745,752

[22] Filed: Aug. 16, 1991

[51] Int. Cl.$^5$ ............................................... F25D 5/00
[52] U.S. Cl. ........................................ 62/304; 62/239; 62/314
[58] Field of Search ............... 62/304, 314, 315, 239, 62/244

[56] References Cited

U.S. PATENT DOCUMENTS

| | | | |
|---|---|---|---|
| 2,083,436 | 6/1937 | Bothezat | 62/304 |
| 2,150,514 | 3/1939 | McInnerney | 62/314 |
| 2,749,725 | 6/1956 | Essman et al. | 62/314 |
| 2,959,032 | 11/1960 | Davis | 62/314 |
| 2,970,456 | 2/1961 | Rice | 62/244 |
| 3,214,936 | 11/1965 | Di Peri | 62/31 |
| 4,798,060 | 1/1989 | Long et al. | 62/304 |
| 4,953,831 | 9/1990 | Albrecht | 62/314 |

Primary Examiner—Albert J. Makay
Assistant Examiner—William C. Doerrler
Attorney, Agent, or Firm—Stephen D. Carver

[57] ABSTRACT

A portable, evaporative air cooler ideal for off-road utility vehicles such as bulldozers, earth working equipment and the like. A corrosion-resistant, plastic housing comprises a rigid rectangular base and a rigid mating cover. The cover defines an air inlet, a fan intake plenum, and an air output. A fan mounted on the cover draws ambient air into the housing and outputs cooled, humidified air through an adjustable, louvered air distributor head adjustably positioned by the user. The distributor head may be coupled directly to the air output, or it may be remotely positioned with a flexible hose. The base defines a reservoir subdivided into an air admission compartment, an adjacent wick compartment, and a terminal filter compartment. Water within the reservoir partially fills all three compartments. The air admission compartment is covered by a prefilter grate that prescreens incoming particulate matter. The wick compartment seats a corrugated, absorbent wick having a plurality of air passageways. An anti-sloshing filter integrally projecting from the wick covers the filter compartment. Air drawn through the air inlet is screened through the grate, humidified and filtered. The cooled, humidified air is forced upwardly through the fan intake plenum and discharged through the distributor head into the application area. Cooled air from the output also cools the fan motor during operation.

10 Claims, 4 Drawing Sheets

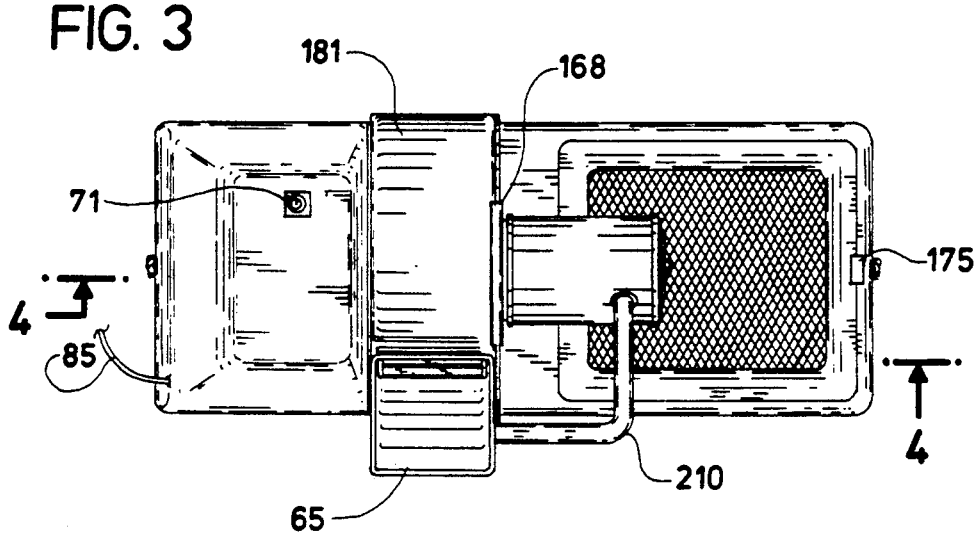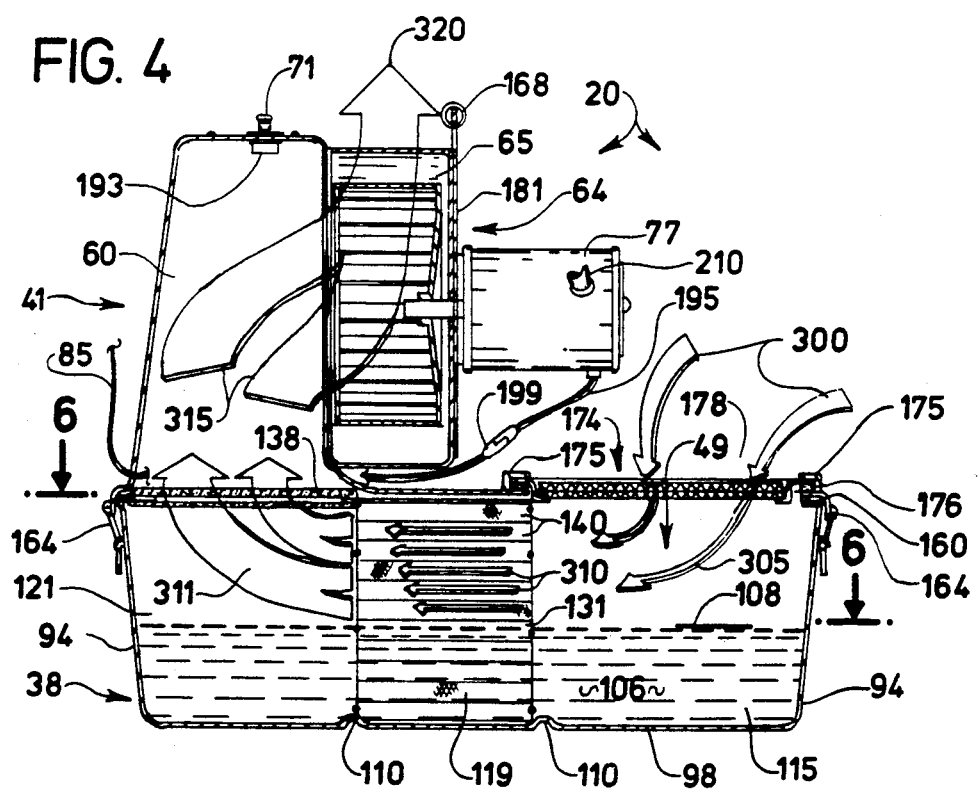

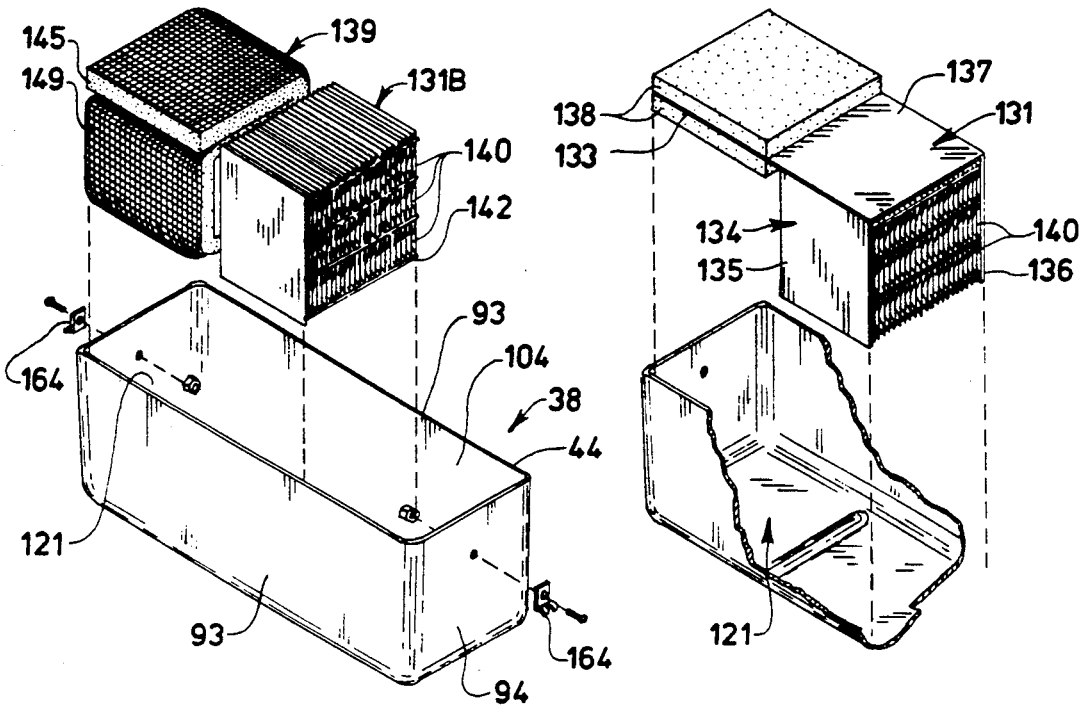
FIG. 5B  FIG. 5A
FIG. 6
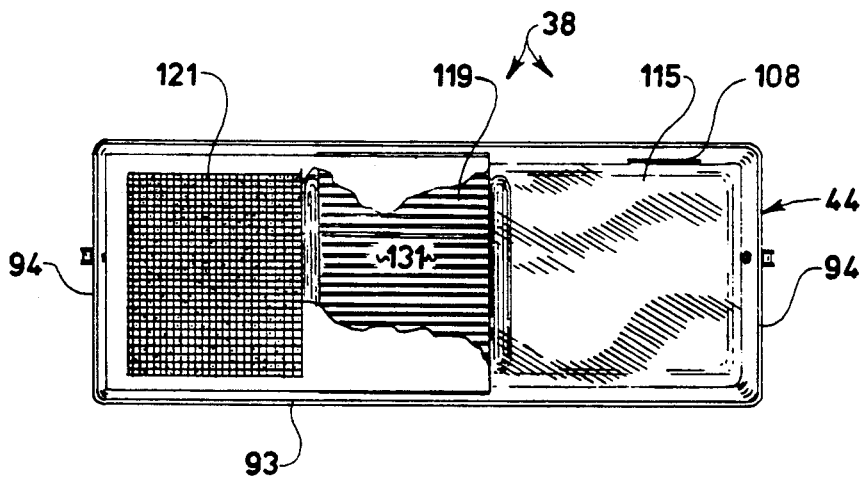

OFF-ROAD EVAPORATIVE AIR COOLER

BACKGROUND OF THE INVENTION

This invention relates broadly to evaporative cooler devices. More specifically, the present invention relates to portable evaporative air coolers adapted for temporary use in vehicles.

Evaporative coolers can provide relatively inexpensive air conditioning in warm, dry environments with low relative humidity. They are most efficient when a significant wet bulb depression exists. In the past, evaporative air coolers have been widely employed in arid or even desert regions where they can provide twenty to thirty degrees of cooling relatively inexpensively. Evaporative air conditioners have previously been employed in vehicles and portable units are also known to the art. Since by their nature evaporative coolers must contain a significant volume of water, prior art coolers must be mounted within a level, relatively shock free location to prevent splashing and spilling.

Off-road vehicles such as bulldozers, agricultural implements and tractors usually lack air conditioning. Many boats, campers, and the like similarly lack effective cooling. In the summer months the cabs of typical earth moving machines can experience extremely uncomfortable temperatures, particularly in the American South and South-West.

Coolers that are fixedly mounted are too expensive; it simply costs too much for typical construction companies to provide each of the machines in their fleet with separate air conditioners. Many of the machines are used only during certain limited operations associated with a construction project. During a typical day, a workman may operate several machines, and switch between them as the job applications dictate. Interior space in such vehicles is typically very limited and the driver cabin is usually small and cramped, with room for little else than essentials. Known portable coolers intended for use in vehicles often have bulky cabinets that are difficult to position conveniently. The air circulating through the cooler creates turbulence in the water therewithin. When the vehicle encounters rough terrain, the water often splashes out of the canister, entering the air outlets.

If a cooler is to be employed in such vehicles successfully on a cost efficient basis, it should be easily moved between vehicles. Coolers that employ a mechanical pump are also extremely sensitive to changes in the water level such as is experienced in rough terrain applications. If too little water is available due to splashing or tilting, the pumps will not function properly and may be damaged. If too much water is introduced, it may enter the fans or air intakes and damage the system. Such problems with known prior art evaporative coolers make them disadvantageous for use in heavy construction equipment and off-road vehicles.

Evaporative air coolers are well known in the art. Typical evaporative air coolers employ a motorized fan to draw ambient air into the cooler housing. The air passes through a wet absorbent media for cooling. Various types of absorbent media have been employed, including trickle pads, fiber filters, and excelsior mats. When the water evaporates, heat is removed from the air, and the air is thus cooled. As the air temperature decreases, its relative humidity increases. The evaporative system will not function unless the water supply to the system is maintained.

U.S. Pat. No. 2,786,406 issued Mar. 26, 1957 discloses an evaporative cooler designed for window mounting. A rotating wick within the chamber humidifies air passing by and around it. Such systems are inefficient, and generally splash and spray water into the vehicle interior. Moreover, such coolers are not well suited for use with large equipment, where the operator is provided extremely little headroom or window access.

U.S. Pat. No. 4,798,060 issued Jan. 17, 1981 discloses a portable evaporative air cooler resembling an ice chest. An evaporative pad disposed within the cooler is rotated by an electric motor. As the pad is rotated, resultant vacuum draws ambient air into the cooler. Air is delivered from outside the vehicle via a flexible hose or duct which projects into the casing. Water is periodically injected into the wick pad by a pump-driven sprayer. In use, the cooler is filled with water and coupled to the vehicle battery by an electric cigar lighter connector. The air is cooled as it is drawn through the evaporative pad.

An evaporative cooler disclosed in U.S. Pat. No. 4,970,876 issued Nov. 20, 1990 comprises a liquid storage sump associated with a motor driven fan that is positioned beneath the dash of a standard automobile. The system comprises a plurality of air passageways in fluid flow communication with humidifying wicks. In one embodiment, a pump is provided to moisten the wicks.

U.S. Pat. No. 4,953,831 issued Sep. 4, 1990 discloses a low-volume evaporative air cooler that is suitable for installation in a vehicle. Air flow is established through a reduced diameter inlet and circulated through an absorbent wick by a squirrel cage fan. Air is drawn from the interior of the vehicle, circulated through the wick, and expelled through an adjustable louver vent. However, the system is disadvantageous because it employs a pump, is subject to damage under harsh environmental conditions, easily spills the contained water, and has limited potential for diverse mountings.

Hickley U.S. Pat. No. 4,926,656 issued May 22, 1990 discloses a cooling system that combines indirect and direct heat exchange. Air is first introduced into the apparatus by a blower that passes the air through a cooling coil and subsequently through an evaporative media. The evaporative pad is supplied with water circulated by a pump associated with the water storage sump in the rear of the device. The device is not suited to application as a portable system such as would be useful for rough-terrain vehicles.

My previous U.S. Pat. No. 4,977,756 is directed to an evaporative air cooler for fixed applications. The latter system is not well-adapted to application in rough-terrain vehicles and heavy equipment. Other less relevant evaporative coolers designed for vehicles are disclosed in the following U.S. Pat. No. 3,978,174 issued Aug. 31, 1976, U.S. Pat. No. 3,552,097 issued Jan. 5, 1971, and U.S. Pat. No. 3,372,911 issued Mar. 12, 1968.

Hence, it is desirable to provide a convenient, lightweight portable evaporative air cooler that can be readily adapted for use in vehicles subjected to off-road conditions. Such a cooler must be compact, and should be well adapted for temporary mounting in a variety of vehicles in a variety of configurations.

SUMMARY OF THE INVENTION

My new portable evaporative air cooler is ideal for use in confined areas such as the cabins of off-road vehicles or in remote areas. Its rugged, compact configuration enables it to be conveniently transported and used in a variety of settings, and switched between vehicles as conditions dictate. It can be easily refilled with a minimum of inconvenience.

A rigid, box-like housing is generally in the form of a parallelepiped. This heavy-duty, corrosion-resistant plastic housing may be conveniently positioned as desired on the floor or other supporting surface within the vehicle. The housing preferably comprises an elongated base and a removable access cover. The admission end of the housing defines an air inlet that is covered by a grate assembly. The grate assembly can be integral with the cover, or it may comprise a separate removable assembly. The grate pre-filters particulate matter from incoming air. The output end of the housing slidably receives an adjustable, louvered distributor head and an optional flexible hose which may be coupled to the head when it is positioned remote from the housing.

A conventional squirrel cage D.C. fan is mechanically secured externally of the housing upon the cover. Ambient air drawn through the housing is cooled and filtered. The fan is controlled by a three-speed switch. The motor is powered by the existing D.C. power system associated with the vehicle. The fan and switches are protectively housed within a hollow fan intake plenum.

The hollow base contains water used for cooling. A water level line clearly indicates the fill level of the base. The base is subdivided by reinforcing ribs into an air admission compartment, an adjacent wick compartment, and a terminal filter compartment. The air admission compartment defines a space into which air is initially received and circulated. Some heat exchange occurs as the air contacts the water within the air admission compartment.

The air is then drawn into the wick compartment and passed through an absorbent wick. In the best mode, the wick is permanently mounted within a rigid filter cartridge. The cartridge is comprised of two rigid side walls and a top. The wick comprises layers of corrugated, absorbent material loosely bound together to define air passageways. The wick absorbs water contained within the base. As the air moves through the plurality of air passageways, it is humidified and cooled. The wick may be easily removed for periodic cleaning and replacement. Humidified air passes from the wick into the adjacent filter compartment.

Preferably the filter cartridge top comprises an integrally outwardly projecting baffle wrapped with filter media that covers the filter compartment. Alternatively, a separate, generally cubicle filter may be inserted within the filter compartment. The preferred filter comprises a pad of porous, substantially nonabsorbent material that captures liquid water and particulate matter that may remain in the air. The pad is permanently mounted to the cartridge baffle that is integral to the rigid filter cartridge. The filter prevents the water from sloshing out of the base in response to movement-induced shocks. The alternative filter is comprised of a roll or block of porous, substantially nonabsorbent, spun material.

An air plenum mounts a tubular, hollow, fan-protective shroud. A generally circular plate is removably coupled to the opposite side of the shroud and supports the fan motor. The motor shaft projects through the plate and rotatably mounts a squirrel-cage fan. Disposed within the plenum is a three-speed fan switch. The switch is controlled by a rotatable knob which projects through the top of the plenum for convenient access by the operator. The switch is shielded by the shroud from undesired impacts and by the anti-sloshing filter from contact with liquid water contained in the base.

When the motor is activated, the fan draws warm ambient air into the base and subsequently forces the cooled, humidified air out through the output and distributor head. Cooled air is also directed into the motor via a flexible hose coupled to the output. The degree of cooling achieved by the unit ranges from eight to eighteen degrees, depending on the relative humidity.

Thus it is a broad object of the present invention to provide a portable, evaporative air cooler for vehicular use.

A similar object is to provide a portable evaporative air cooler that may easily be shifted between a variety of applications.

A similar broad object is to provide a portable evaporative air cooler ideal for use with construction equipment.

Another broad object is to provide an evaporative air cooler of the character described for use with off-the-road vehicles, agricultural implements, tractors, road-working equipment, boats, campers, and the like.

A further basic object of the present invention is to provide an evaporative cooler that can be conveniently positioned by the user anywhere within the cramped cabin of a utility vehicle.

An additional broad object of the present invention is to provide a portable evaporative cooler that controls undesired splashing and spraying of the water.

Another object of the present invention is to provide a conveniently portable air cooler in which the motor and operative parts are protected from contact with the water contained therein.

Still another object of the present invention is to provide a portable cooler unit that is well adapted for use under harsh environmental conditions.

Yet another object of the present invention is to provide a conveniently portable, rugged, compact, and highly versatile cooler useful in a variety of environments.

A further object of the present invention is to provide a portable cooler that efficiently cools without the use of a pump or sprayer.

Still another object of the present invention is to provide an evaporative cooler that both humidifies and filters the outputted air.

Yet another object of the present invention is to provide a portable evaporative cooler that facilitates convenient filling, cleaning, maintenance, and repair.

A further object of the present invention is to provide an evaporative cooler in which the electrical components and motor are safely isolated from contact with the water stored within the cooler.

An additional object of the present invention is to provide a wick-type evaporative cooler that is compact, portable, resistant to corrosion, and can be conveniently stored and used in a variety of settings.

Still another object of the present invention is to provide a compact, portable, evaporative air cooler that can be used in a number of environments not well adapted for conventional compressor-type air conditioning systems.

These and other objects and advantages of my portable evaporative air cooler will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a fragmentary, top plan view thereof;

FIG. 4 is a fragmentary, sectional view taken generally along line 4—4 of FIG. 3, wherein the passage of air has been pictorially represented by arrows;

FIG. 5A is a fragmentary, exploded isometric view of the preferred base thereof showing the wick-filter projection;

FIG. 5B is a fragmentary, exploded isometric view similar to FIG. 5A showing the alternative filter system;

FIG. 6 is a sectional view taken generally along line 6—6 of FIG. 4; and,

DETAILED DESCRIPTION OF THE DRAWINGS

Figure 1:
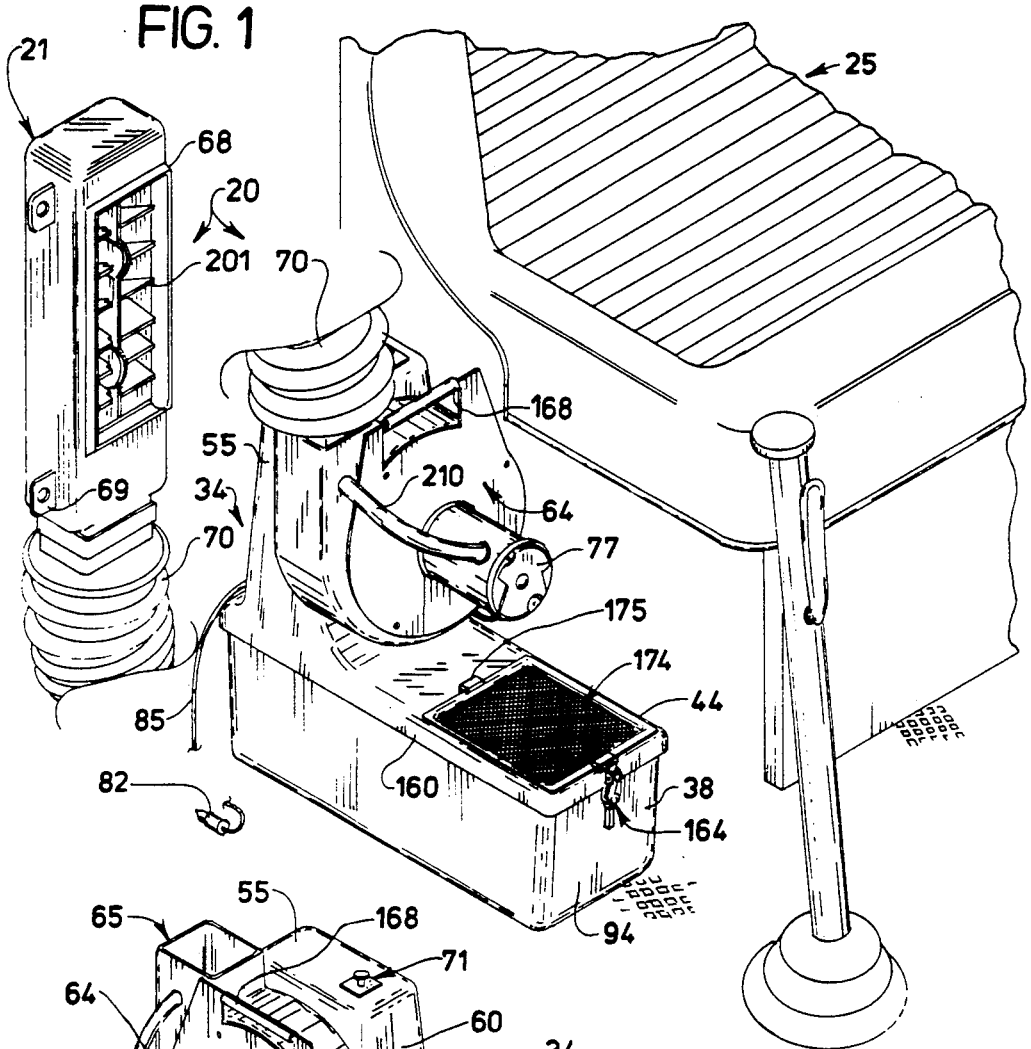
FIG. 1 is a fragmentary pictorial view illustrating my new off-road evaporative air cooler in use within a typical cab.
Figure 2:
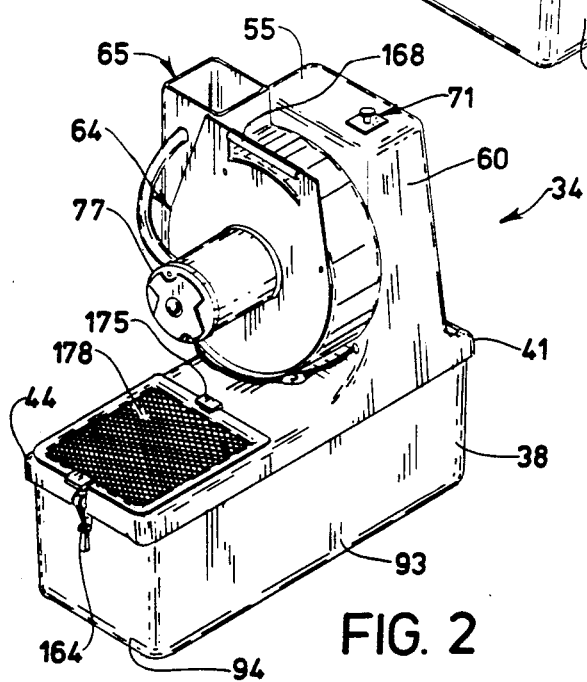
FIG. 2 is a fragmentary, perspective view of the unit.

With initial reference to FIGS. 1 and 2 of the accompanying drawings, the best mode of my new off-road evaporative air cooler is broadly designated by the reference numeral 20. Cooler 20 is lightweight and compact, and may be conveniently transported for use in a variety of applications, and it may assume a variety of orientations. Cooler 20 is ideal for use in a confined area 25 within the cabin of an off-road vehicle such as a tractor, jeep, dozer, crane, boat, camper, or the like. Its relative compactness allows it to be positioned as desired anywhere a small, relatively unobstructed cabin available volume exists. The associated air distributor 21 can be easily manipulated to direct cooled air anywhere within the vehicle cabin.

In the best mode cooler 20 comprises a rigid, heavy-duty, corrosion-resistant plastic housing broadly designated by the reference numeral 34. Housing 34 preferably comprises an elongated, base 38 that is generally in the form of a parallelepiped. The base matingly receives a removable plastic cover 41. The housing comprises an air admission end 44 and a spaced apart output end 55, both of which are in fluid flow communication with the base interior. The cover includes a fan intake plenum 60 adapted to be disposed over the base output end 55. A fan assembly 64 is mechanically secured to the plenum, and it includes a cool air output 65 adapted to be hose-coupled to the air distributor 21. The air distributor terminates in a louvered head 68 that the operator can position as desired for directing cooled air. Head 68 is disposed at the remote end of a flexible hose 70, and it can be secured with one or more of a plurality of spaced apart mounting tabs 69

The variable-speed fan assembly 64 draws air into and through the housing 34. The speed control knob 71 is mounted on top of fan intake plenum 60, where it can be conveniently accessed by the operator to adjust the fan motor 77. In the best mode, motor 77 is conveniently connected to the existing 12-volt or 24-volt D.C. vehicle power supply by a conventional cigar lighter plug 82 coupled to power cord 85.

As best viewed in FIGS. 4–6, base 38 comprises rigid side walls 93 integral with end walls 94 and a rigid, lower floor 98. A hollow interior 104 (FIG. 5B) surrounded by walls 93 and 94 defines a water containment reservoir. In the best mode, the base comprises a width roughly nine to ten inches, a height roughly five to eight inches, and a length roughly eighteen inches. Reservoir 104 contains water 106 supplied to the unit for cooling. Water 106 contained within base 38 is preferably maintained at a preselected level indicated by a water level line 108. In the best mode, roughly one gallon of water may initially be poured into the unit.

Elongated reinforcing ribs 110 project from floor 98 into interior 104 to subdivide base 38 into an air admission compartment 115, an adjacent wick compartment 119, and a terminal filter compartment 121. Water 106 is contained in all three compartments 115, 119, and 121. However, as explained hereinafter, the present structure prevents water 106 from sloshing out of the cooler 20 during transport or when vehicle encounters rough terrain.

Wick compartment 119 receives a box-like, generally cubicle filter cartridge 134 (FIGS. 5A, 5B). Wick 131 comprises a plurality of layers of absorbent, fibrous filter material corrugated to define a plurality of adjacent air passageways 140. In the best mode, the wick 131 is permanently mounted within a rigid filter cartridge 134. The cartridge 134 is comprised of two rigid side walls 135, 136 and a top 137. The cartridge top 137 comprises an integrally outwardly projecting baffle 133 that horizontally projects over the base filter compartment 121.

The filter compartment 121 is covered with a filter pad having adjacent layers 138 disposed upon opposite sides of baffle 133. Layers 138 are porous, substantially nonabsorbent material that capture liquid water and particulate matter which may remain in the air. Preferably pad layers 138 are permanently mounted to each side of the cartridge baffle 133. The pads do not dehumidify the air coming from the wick compartment 119. The filter prevents the water 106 from sloshing out of the base 38 or into the air intake plenum 60. In the event the cooler is agitated during transport or by rough terrain, the water 106 is not permitted to slosh out or contact the electrical components housed within cooler cover 41.

Alternatively a separate, generally cubicle filter 139 (FIG. 5B) is employed. In this case wick 131B is similar to wick 131 discussed above, but it omits the baffle 133 (FIG. 5A). It comprises a plurality of layers of corrugated, absorbent filter material loosely bound together to define a plurality of air passageways 140. The layers are preferably loosely bound together by strips of glue 142 or other resilient material. Water 106 contained within base 38 is absorbed by the wick and dispersed throughout the layers. Air passing through the wick is humidified and cooled by evaporation. Filter 139 comprises a roll or block of porous, substantially nonabsorbent, spun material 145 having a web-like backing 149. The porous filter captures any liquid water and particulate matter that may remain in the cooled air. Importantly, filter 139 also provides a physical barrier to prevent liquid water 106 contained in base 38 from sloshing upwardly into cover 41 and plenum 60.

For best results, the filter cartridge 134 should be periodically cleaned, and it should be replaced at least twice a year for optimum cooling and humidification. Air drawn through wick compartment 119 is filtered and humidified before it passes into the filter compartment 121.

Figure 7:
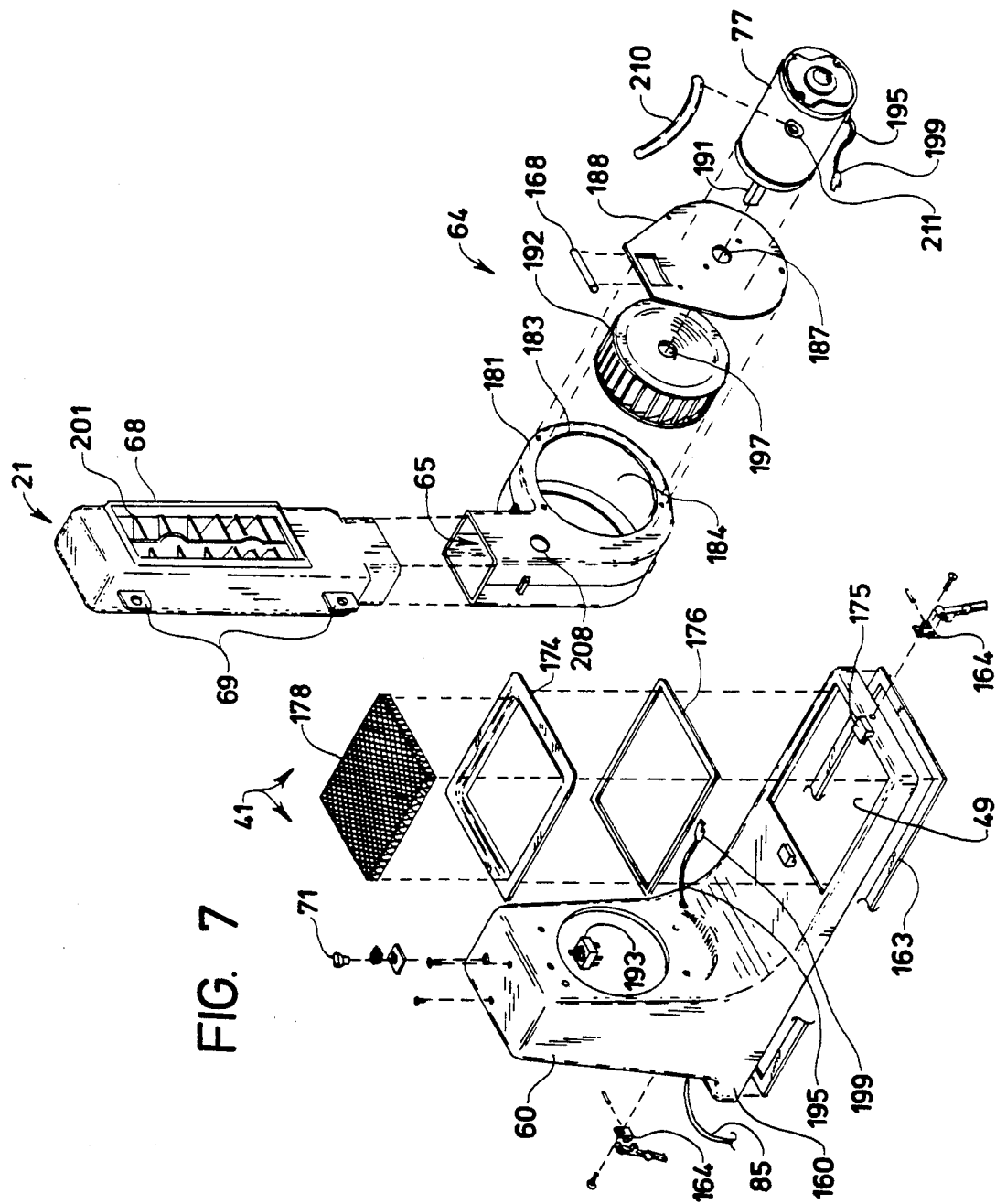
FIG. 7 is a fragmentary, exploded isometric view of the preferred cover and motor assembly.

With specific reference now directed to FIGS. 3, 4, and 7, cover 41 comprises an air inlet 49, an integral, upwardly rising fan intake plenum 60, and a rigid peripheral flange 160. Flange 160 surrounds and rests upon base walls 93 and 94. An impermeable gasket 163 (FIG. 7) that is sandwiched between the cover and the base prevents water 106 from sloshing out. The cover is removably coupled to base 38 by resilient, mechanical latches 164. A rigid handle 168 (FIG. 1) is preferably coupled to the top of intake plenum 60 to enable convenient transport of cooler 20. Cover 41 comprises a width of nine to ten inches, a height of five to eight inches, and a length of roughly eighteen inches.

Air inlet 49 is covered by a grate 174, which mounts preferably metallic pre-filter 178. The grate 174 can be integral with the cover or it can be a separate unit. Filter 178 screens larger particulate matter, such as sand and ash, out of the inflowing air stream and helps prevent water from sloshing out of the cooler. Grate 174 can be removably secured to cover 41 by engaging suitable retainer tabs 175, and sealed thereto by an optional peripheral impermeable gasket 176 (FIGS. 4, 7). Grate 174 may be conveniently removed to enable periodic cleaning or replacement of filter 178 as needed. Air is drawn through grate 174 and inlet 49 by suction created by fan assembly 64.

As best viewed in FIGS. 4-7, fan assembly 64 comprises a tubular, hollow shroud 181 that terminates in cooled air output 65. Shroud 181 is mounted to the intake plenum 60 by conventional screws, so that rim 183 coaxially surrounds orifice 184 defined in the plenum. A circular motor-mounting plate 188 is removably coupled to rim 183 to support motor 77. Plate 188 is preferably removably mounted to enable convenient repair or replacement of the motor when needed. The motor shaft 191 projects through orifice 187 in plate 188 and orifice 197 in fan 192. The rotatably mounted squirrel-cage fan 192 is thus enclosed within shroud 181.

Shroud 181 upwardly terminates in cool air outlet 65. Cooled and humidified air discharged through outlet 65 is dispersed into confined area 25 by the elongated, louvered head 68. Head 68 may be either slip-fitted over the end of output 65 (FIG. 7) or remotely positioned and coupled via a flexible hose 70 to output 65 (FIG. 1). Head 68 may be selectively positioned with its pivotal louvers 201 adjusted so that it directs the cooled, humidified air toward the operator.

In the best mode, output 65 also comprises a vent 208 that receives one end of a cooler tube 210. The opposite end of tube 210 terminates in motor orifice 211. Cooled air discharged from the unit is drawn into motor 77 to prevent overheating during operation.

Cooler 20 is preferably powered by the existing vehicle power supply. Flexible power cable 85 couples motor 77 to the existing 12-volt or 24-volt D.C. vehicle power supply. While cable 85 may be connected by inserting plug 82 into a cigarette lighter outlet, it is preferred that cable 85 be electrically connected directly to an available power connection such as a fuse box. For example, using 14-gauge automotive wire, the operator may couple the unit directly to the battery. Where additional wiring is used, additional fusing should be used at the point of connection.

Based on my experimentation, a 12-volt unit will draw 11.0 amps, and the 24-volt unit draws 5.5 amps. It will be appreciated that cooler 20 must be connected to a device that is capable of delivering the required current for sustained intervals. A fully-charged 120-amphour battery will sustain operation of the 12-volt unit for approximately ten hours.

Power thus supplied to the motor is preferably controlled by a three-speed switch 193 associated with control knob 71. Switch 193 is mounted within the plenum 60, above the filter compartment 121. The filter resists the admittance of water through plenum 60, which is naturally drawn into this region by suction. The vacuum head applied to the water level at the intake end of the apparatus helps resist sloshing and spilling through the grate 174. Wires 195 terminating in mating plugs 199 removably couple motor 77 to switch 193. Switch 193 is housed within plenum 60 where it is protectively shielded from undesired contact. The anti-sloshing filter 139 protects the switch 193 from contact with water 106 contained in base 38.

OPERATION

In operation, cooler 20 draws ambient air from the vehicle cabin, filters and cools it by evaporation, then discharges cooled and filtered air into the cabin. The arrows of FIG. 4 illustrate the path of air flow through cooler 20. Ambient air 300 is drawn into the cooler by suction created by fan assembly 64. Incoming air 300 is screened through pre-filter 178 and enters air admission compartment 115. Screened air 305 creates a head of pressure against water contained within the cooler base 38. Limited cooling occurs from evaporation as air passes over the water 106 collected within the air admission compartment 115. Air 310 is then drawn through wick passageways 140, where it is cooled and humidified. Cooled, humidified air 311 passing from wick 131 is drawn through filter layers 138 (FIGS. 4, 5A), which remove liquid droplets and particulate matter.

The cooled, filtered air 315 is sucked into fan intake plenum 60 and circulated by squirrel fan 192 through the shroud 181. Cooled air 320 is then discharged through output 65 and head 68 (or hose 70) into the confined area 25. Head 68 will be positioned for satisfactory air flow, and louvers 201 can be adjusted to establish a comforting breeze of cooled air. A small amount of cooled air 320 is drawn by suction through tube 210 into motor 77 to cool the motor during operation.

As will be appreciated, the degree of cooling achieved depends generally on the wet bulb depression. In arid regions of low relative humidity, the ambient air is capable of carrying more water, and cooling of fifteen to twenty degrees Fahrenheit may be achieved. In more humid areas, cooling between eight and twelve degrees is commonly achieved.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A portable evaporative air cooler for use within a confined space, said evaporative air cooler comprising:
 a housing adapted to be disposed upon a supporting surface, said housing comprising a floor and a hollow interior reservoir for storing water, said reservoir comprising an air admission compartment, a spaced apart filter media compartment, and a wicking compartment disposed between said air admission compartment and said filter media compartment;
 a wick disposed within said wicking compartment and immersed within said water for humidifying air passing therethrough;
 a filter disposed within said reservoir adjacent said wick for filtering air traveling therethrough, said filter immersed within said water;
 a removable cover adapted to be sealably coupled to said housing over said reservoir;
 said wick and said filter disposed upon said floor and extending between said floor and said cover for minimizing water sloshing; and,
 fan means mounted externally of said reservoir upon said cover above said housing for drawing air into and through said housing, said air passing through said air admission compartment, said wick and said filter whereby air is evaporatively cooled, said fan means comprising a fan outlet in fluid flow communication with said reservoir and adapted to be coupled to a hose for directing cooled air in a desired direction within said confined space.

2. The cooler as defined in claim 1 including grate means defined in said top and disposed above said air admission compartment for prefiltering air drawn into said reservoir and for resisting water sloshing.

3. The cooler as defined in claim 2 wherein said wick comprises multiple layers of absorbent, fibrous material spaced apart to define a plurality of air passageways through which air is drawn for cooling.

4. A portable, evaporative air cooler for use within a vehicle, said evaporative air cooler comprising:
 a rigid base generally in the form of a parallelpiped adapted to be disposed upon a supporting surface for containing water, said base divided into an air admission compartment at one end of said base, a filter compartment at an opposite end of said base, and a wick compartment disposed between said air admission compartment and said filter compartment;
 a wick disposed within said wick compartment and immersed in water;
 a filter disposed within said filter compartment adjacent said wick for resisting water sloshing, said filter immersed in water;
 a removable cover adapted to be sealably coupled to said base, said cover comprising:
  an air inlet for admitting air into said air admission compartment,
  a grate covering said inlet for prefiltering incoming air and for resisting water sloshing;
  a separate fan intake plenum spaced apart from said grate and adapted to be disposed above said filter, said plenum being in fluid flow communication with said filter compartment;
 fan means mounted upon said cover externally of said base for sanctioning said plenum thereby drawing air through said air admission compartment, said wick, and said filter to thereby humidify and cool the air, said fan means comprising an outlet adapted to be coupled to a hose for directing cooled air in a desired direction within said vehicle.

5. The cooler as defined in claim 4 wherein said base comprises a plurality of integral reinforcing ribs subdividing said base into said air admission compartment, said wicking compartment, and said filter compartment.

6. The cooler as defined in claim 5 wherein said wick comprises multiple layers of absorbent, fibrous material spaced apart to define a plurality of air passageways through which air is drawn for cooling.

7. The cooler as defined in claim 6 wherein said wick comprises an outwardly projecting baffle upon which said filter is mounted.

8. The cooler as defined in claim 7 wherein said filter comprises a roll of spun fiber material coupled to a reinforcing web.

9. A portable, slosh resistant evaporative air cooler comprising:
 a rigid base generally in the form of a parallelpiped adapted to be disposed upon a supporting surface for containing water, said base comprising a floor and a plurality of spaced apart ribs integrally formed in the floor for dividing the base into an air admission compartment at one end of said base, a filter compartment at an opposite end of said base, and a separate wick compartment disposed between said air admission compartment and said filter compartment;
 a wick disposed within said wick compartment and immersed in water for humidifying air traveling therethrough;
 a filter disposed within said filter compartment for filtering air traveling therethrough, said filter immersed in water;
 a removable cover adapted to be sealably coupled to said base, said cover comprising:
  an air inlet for admitting air into said air admission compartment,
  a grate covering said inlet for prefiltering incoming air;
  a fan intake plenum spaced apart from said grate and adapted to be disposed above said filter compartment for resisting sloshing, said plenum being in fluid flow communication with said filter compartment;
 said wick and said filter disposed upon said floor and extending between said floor and said cover for minimizing water sloshing; and,
 fan means externally mounted upon said cover for suctioning said plenum and thereby drawing air through said air admission compartment, said wick and said filter, said fan means comprising an outlet for directing cooled air in a desired direction.

10. The cooler as defined in claim 9 including an anti sloshing filter disposed above said filter compartment adjacent said wick for minimizing the admission of water into said plenum and said fan means.

* * * * *